United States Patent
Miyazaki et al.

(10) Patent No.: US 8,021,782 B2
(45) Date of Patent: Sep. 20, 2011

(54) NONAQUEOUS ELECTROLYTE SECONDARY BATTERY

(75) Inventors: Shinya Miyazaki, Moriguchi (JP); Tatsuyuki Kuwahara, Moriguchi (JP)

(73) Assignee: Sanyo Electric Co., Ltd., Moriguchi-shi, Osaka (JP)

(*) Notice: Subject to any disclaimer, the term of this patent is extended or adjusted under 35 U.S.C. 154(b) by 395 days.

(21) Appl. No.: 12/397,467

(22) Filed: Mar. 4, 2009

(65) Prior Publication Data

US 2009/0239143 A1  Sep. 24, 2009

(30) Foreign Application Priority Data

Mar. 19, 2008 (JP) ................. 2008-072176

(51) Int. Cl.
*H01M 4/48* (2010.01)
(52) U.S. Cl. ............... 429/223; 429/188; 252/182.1
(58) Field of Classification Search ........... 429/223, 429/188; 252/182.1
See application file for complete search history.

(56) References Cited

U.S. PATENT DOCUMENTS

2007/0015058 A1* 1/2007 Takezawa et al. ....... 429/231.95

FOREIGN PATENT DOCUMENTS

| JP | 3244314 B2 | | 1/2002 |
|---|---|---|---|
| JP | 2005044722 | * | 2/2005 |
| JP | 2007317582 | * | 12/2007 |
| JP | 2008084743 | * | 4/2008 |

* cited by examiner

*Primary Examiner* — Patrick Ryan
*Assistant Examiner* — Ladan Mohaddes
(74) *Attorney, Agent, or Firm* — Westerman, Hattori, Daniels & Adrian, LLP

(57) ABSTRACT

The present invention provides a nonaqueous electrolyte secondary battery with an excellent packing property and remarkably improved high-temperature cycle characteristics and thermal stability. The nonaqueous electrolyte secondary battery 10 includes a positive electrode plate 11 having a positive electrode active material able to absorb and desorb lithium ions, a negative electrode plate having a negative electrode active material capable of absorption and desorption of lithium ions, and a nonaqueous electrolyte, and the positive electrode active material includes a mixture of material A: $Li_wNi_xCo_yMn_zO_2$ (where $1.00 \leq w \leq 1.30$, $x+y+z=1$, $0.40 \leq x \leq 0.50$, and $0.30 \leq y \leq 0.40$) and material B: $Li_wNi_xCo_yMn_zO_2$ (where $1.00 \leq w \leq 1.30$, $x+y+z=1$, $0.30 \leq x \leq 0.35$, and $0.30 \leq y \leq 0.35$).

5 Claims, 1 Drawing Sheet

(RELATED ART)

NONAQUEOUS ELECTROLYTE SECONDARY BATTERY

TECHNICAL FIELD

The present invention relates to a nonaqueous electrolyte secondary battery including a positive electrode plate having a positive electrode active material capable of absorption and desorption of lithium ions, a negative electrode plate having a negative electrode active material capable of absorption and desorption of lithium ions, and a nonaqueous electrolyte. More particularly, the invention relates to a nonaqueous electrolyte secondary battery with an excellent packing property and remarkably improved high-temperature cycle characteristics and thermal stability.

BACKGROUND ART

As portable electronic equipment spreads rapidly, the specification of the batteries used for them have been becoming more strict year after year. Especially, batteries with a compact and slim size, high-capacity, excellent cycle characteristics, and stable performance are required. In addition, in the field of secondary batteries, lithium nonaqueous electrolyte secondary batteries with higher energy density than other batteries have been drawing attention, and the market share of lithium nonaqueous electrolyte secondary batteries in the secondary battery market has shown a large increase.

FIG. 1 is a perspective view showing a longitudinal section of a commonly manufactured cylindrical-shaped nonaqueous electrolyte secondary battery. The nonaqueous electrolyte secondary battery 10 uses a rolled electrode 14 formed by rolling a positive electrode plate 11 and a negative electrode plate 12 with a separator 13 interposed therebetween, and is manufactured by the following steps: insulting plates 15 and 16 are placed on upper and lower faces of the rolled electrode 14, respectively; then the whole is put into a cylindrical-shaped battery outer can 17 also serving as a negative electrode terminal; a negative electrode current collecting tab 12a connected to the negative electrode plate 12 is welded on an inner bottom part of the battery outer can 17 and also a positive electrode current collecting tab 11a connected to the positive electrode plate 11 is welded on a bottom plate part of a current breaking cover 18 equipping a safety apparatus; a predetermined nonaqueous electrolyte is poured from an opening of the battery outer can 17; and then the battery outer can 17 is sealed up with the current breaking cover 18. Such a nonaqueous electrolyte secondary battery shows excellent effects of higher battery performance and reliability.

In the nonaqueous electrolyte secondary batteries, as a positive electrode active material, one of or a mixture of a plurality of lithium transition-metal composite oxides represented by $Li_xMO_2$ (where M is at least one of Co, Ni, and Mn) capable of absorption and desorption of lithium ions reversibly, that is, $LiCoO_2$, $LiNiO_2$, $LiNi_yCo_{1-y}O_2$ (y=0.01 to 0.99), $LiMnO_2$, $LiMn_2O_4$, $LiNi_xCo_yMn_zO_2$ (x+y+z=1), $LiFePO_4$, or the like, is used.

Among them, lithium cobalt oxide ($LiCoO_2$) is mainly used because its various battery characteristics are especially higher than those of other oxides. However, since cobalt is expensive and the amount of cobalt in natural resources is small, in order to use lithium cobalt oxide as the positive electrode active material of the nonaqueous electrolyte secondary batteries continuously, it is desired that the nonaqueous electrolyte secondary batteries have higher-performance and longer-life-time.

For example, Japanese Patent No. 3244314 discloses an invention of a nonaqueous electrolyte secondary battery using a lithium transition-metal composite oxide represented by $Li_aM_bNi_cCo_dO_e$ (where M is at least one metal selected from the group consisting of Al, Mn, Sn, In, Fe, Cu, Mg, Ti, Zn, and Mo, and ranges are 0<a<1.3, 0.02≦b≦0.5, 0.02≦d/c+d≦0.9, and 1.8≦e≦2.2, and further b+c+d=1 and 0.34<c) (for example, $Li_{1.0}Mn_{0.1}Ni_{0.45}Co_{0.45}O_{2.0}$) as the positive electrode active material. Since a crystal structure of the positive electrode active material is comparatively stable even if Li is extracted at the time of charging, even if charging and discharging are performed repeatedly, the crystal structure is not destroyed and reversible charging and discharging can be performed.

When considering to increase the capacity of the nonaqueous electrolyte secondary batteries using lithium cobalt oxide as the positive electrode active material, achievement of higher-performance and higher-safety of the batteries is a fundamental problem. As discussed above, so-called three-component positive electrode active materials containing three components of Ni, Co, and Mn with various compositions in the structures are known. However, the conventional three-component positive electrode active materials have advantages and disadvantages, respectively, for example, a high Mn composition improves the thermal stability but is apt to deteriorate the capacity, and a high Ni composition improves the capacity but is apt to deteriorate the safety. Accordingly, in order to accept higher-performance and higher-safety of the three-component positive electrode active material containing three components of Ni, Co, and Mn in the structure in future, it is needed to raise the level of the whole performance and to cover the disadvantages.

SUMMARY

An advantage of some aspects of the invention is to provide a nonaqueous electrolyte secondary battery with an especially excellent packing property and remarkably improved high-temperature cycle characteristics and thermal stability, and the battery takes respective advantages of the three-component positive electrode active materials and also covers the disadvantages by using a mixture of a plurality of so-called three-component positive electrode active materials containing three components of Ni, Co, and Mn in the structure.

According to an aspect of the invention, a nonaqueous electrolyte secondary battery includes a positive electrode plate having a positive electrode active material capable of absorption and desorption of lithium ions, a negative electrode plate having a negative electrode active material capable of absorption and desorption of lithium ions, and a nonaqueous electrolyte. The positive electrode active material is a mixture of a material A and a material B, the material A being $Li_wNi_xCo_yMn_zO_2$ (where 1.00≦w≦1.30, x++z=1, 0.40≦x≦0.50, and 0.30≦y≦0.40) and the material B $Li_wNi_xCo_yMn_zO_2$ (where 1.00≦w≦1.30, x+y+z=1, 0.30≦x≦0.35, and 0.30≦y≦0.35).

In the nonaqueous electrolyte secondary battery of the invention, both of the materials A and B are so-called three-component positive electrode active materials containing three components of Ni, Co, and Mn in the structures and both Co content ratios are in the same range. However, a Ni content ratio x of the material A is 0.40≦x≦0.50 and differs from that of the material B of 0.30≦x≦0.35. Mn content ratios of the materials A and B sometimes overlap. The Ni content ratio of the material A is more than that of the material B, and the Mn content ratio of the material A is less than that of the material B, so that the battery has the characteristics of a higher packing property and larger battery capacity. Furthermore, the Ni content ratio of the material B is less than that of the material A and the Mn content ratio of the material B is more than that of the material A, so that the battery has the characteristics of good thermal stability and excellent safety.

Thus, according to the nonaqueous electrolyte secondary battery of the invention, by using the mixture of the materials A and B having the above characteristics, the respective advantages of the materials A and B come synergistically, so that the nonaqueous electrolyte secondary battery with the good packing property and the large battery capacity and further with a good result of the high-temperature cycle test and the excellent safety can be obtained. When a three-component positive electrode active material having an average composition of the materials A and B of the invention is used as the positive electrode active material, the respective disadvantages of the materials A and B are not covered, so that the synergistic effect of the invention does not appear.

In the nonaqueous electrolyte secondary battery, at the time of charging, lithium ions are desorbed from the positive electrode active material, and, at the time of discharging, lithium ions are absorbed in the positive electrode active material. Thus, it is preferred that Li content ratios w of the materials A and B are $1.00 \leqq w \leqq 1.30$. If w is less than 1.00, at the time of charging, exhaustion of lithium ions in the positive electrode active material causes battery capacity deterioration. Furthermore, if w is more than 1.30, since excess alkali which is not absorbed in the skeleton of the three-component positive electrode active material is generated at the time of charging and discharging, gas generation by a reaction of the excess alkali and the nonaqueous electrolyte causes deterioration of the high-temperature cycle characteristics.

Furthermore, as nonaqueous solvents (organic solvents) able to be used in the nonaqueous electrolyte secondary battery of the invention, carbonates, lactones, ethers, esters, or the like can be used, and a mixture of two or more kinds of these solvents can also be used. Among them, the carbonates with large dielectric constants and large ion conductivities of the nonaqueous electrolytes are especially preferred.

Specific examples are ethylene carbonate (EC), propylene carbonate (PC), butylene carbonate (BC), vinylene carbonate (VC), cyclopentanone, sulfolane, 3-methylsulfolane, 2,4-dimethylsulfolane, 3-methyl-1,3-oxazolidine-2-one, dimethyl carbonate (DMC), methyl ethyl carbonate (MEC), diethyl carbonate (DEC), methyl propyl carbonate, methyl butyl carbonate, ethyl propyl carbonate, ethyl butyl carbonate, dipropyl carbonate, γ-butyrolactone, γ-valerolactone, 1,2-dimethoxyethane, tetrahydrofuran, 2-methyltetrahydrofuran, 1,3-dioxolane, methyl acetate, ethyl acetate, and 1,4-dioxane.

As solutes of the nonaqueous electrolyte in the invention, lithium salts commonly used as the solute in the nonaqueous electrolyte secondary batteries can be used. Examples of these lithium salts are $LiPF_6$, $LiBF_4$, $LiCF_3SO_3$, $LiN(CF_3SO_2)_2$, $LiN(C_2F_5SO_2)_2$, $LiN(CF_3SO_2)(C_4F_9SO_2)$, $LiC(CF_3SO_2)_3$, $LiC(C_2F_5SO_2)_3$, $LiAsF_6$, $LiClO_4$, $Li_2B_{10}Cl_{10}$, and $Li_2B_{12}Cl_{12}$, and mixtures thereof. Among them, $LiPF_6$ (lithium hexafluoro phosphate) is especially preferred. It is preferred that the amount of dissolution of the solute with respect to the nonaqueous solvent is 0.5 to 2.0 mol/L.

In the above-described nonaqueous electrolyte secondary battery, it is preferable that a mixing ratio (a molar ratio) of the materials A and B is A:B=1:9 to 9:1.

If the mixing ratio of the material A is less than 0.1, since the packing property is poor, the battery capacity becomes small along with the result of the high-temperature cycle test becomes inferior, so that the safety at the time of overcharge becomes slightly low. If the mixing ratio of the material A is more than 0.9, since the packing property is poor, the battery capacity becomes small along with the result of the high-temperature cycle test becomes inferior, so that the safety at the time of overcharge becomes extremely low. A more preferable mixing ratio of the materials A and B is A:B=2:8 to 8:2.

Furthermore, in the above-described nonaqueous electrolyte secondary battery of the invention, it is preferable that the w is in a range of $1.01 \leqq w \leqq 1.20$.

In the nonaqueous electrolyte secondary battery of the invention, if the Li content ratio w in the materials A and B as the positive electrode active material is in a range of $1.01 \leqq w \leqq 1.20$, at the time of charging, lithium ions in the positive electrode active material are not exhausted, and moreover, at the time of charging and discharging, the excess alkali which is not absorbed in the skeleton of the three-component positive electrode active material is not generated, so that the nonaqueous electrolyte secondary battery with the excellent high-temperature cycle characteristics can be obtained.

Furthermore, in the above-described nonaqueous electrolyte secondary battery of the invention, it is preferable that the nonaqueous electrolyte includes 1.5 to 5% by mass of vinylene carbonate.

If vinylene carbonate is added to the nonaqueous electrolyte, before insertion of lithium to the negative electrode by the first charging, self-reductive decomposition on a surface of the negative electrode forms a negative electrode surface film (SEI: Solid Electrolyte Interface, hereinafter referred to as "SEI film") also referred to as a passivation layer on a layer of the negative electrode active material. Since the SEI film works as a barrier to inhibit insertion of solvent molecules around lithium ions, decomposition of the nonaqueous electrolyte on the surface of the negative electrode active material is reduced, so that the nonaqueous electrolyte secondary battery with the fine high-temperature cycle characteristics can be obtained. If the content ratio of vinylene carbonate is less than 1.5% by mass, the addition of vinylene carbonate has no effect. Furthermore, if the content ratio of vinylene carbonate is more than 5% by mass, since vinylene carbonate is decomposed on the surface of the positive electrode active material to generate gas, the high-temperature cycle characteristics deteriorate, conversely.

Furthermore, in the above-described nonaqueous electrolyte secondary battery of the invention, it is preferable that the negative electrode active material includes a carbonaceous material.

A battery voltage is shown as a potential difference between positive and negative electrode plates, if the carbonaceous material is used as the negative electrode active material, since the potential of the carbonaceous material is extremely near the potential of Li (approximately 0.1 V with respect to Li), the battery voltage becomes high and the battery capacity can be increased. In addition, unlike lithium metal, since the dendrites do not grow, the battery has excellent characteristics such as high safety, excellent initial efficiency, good potential flatness, and high density. As the carbonaceous material, one kind of or a mixture of a plurality kinds of natural graphite, artificial graphite, carbon black, coke, glassy carbon, and carbon fiber, or burned substances thereof can be used.

DESCRIPTION OF EXEMPLARY EMBODIMENTS

Figure 1:
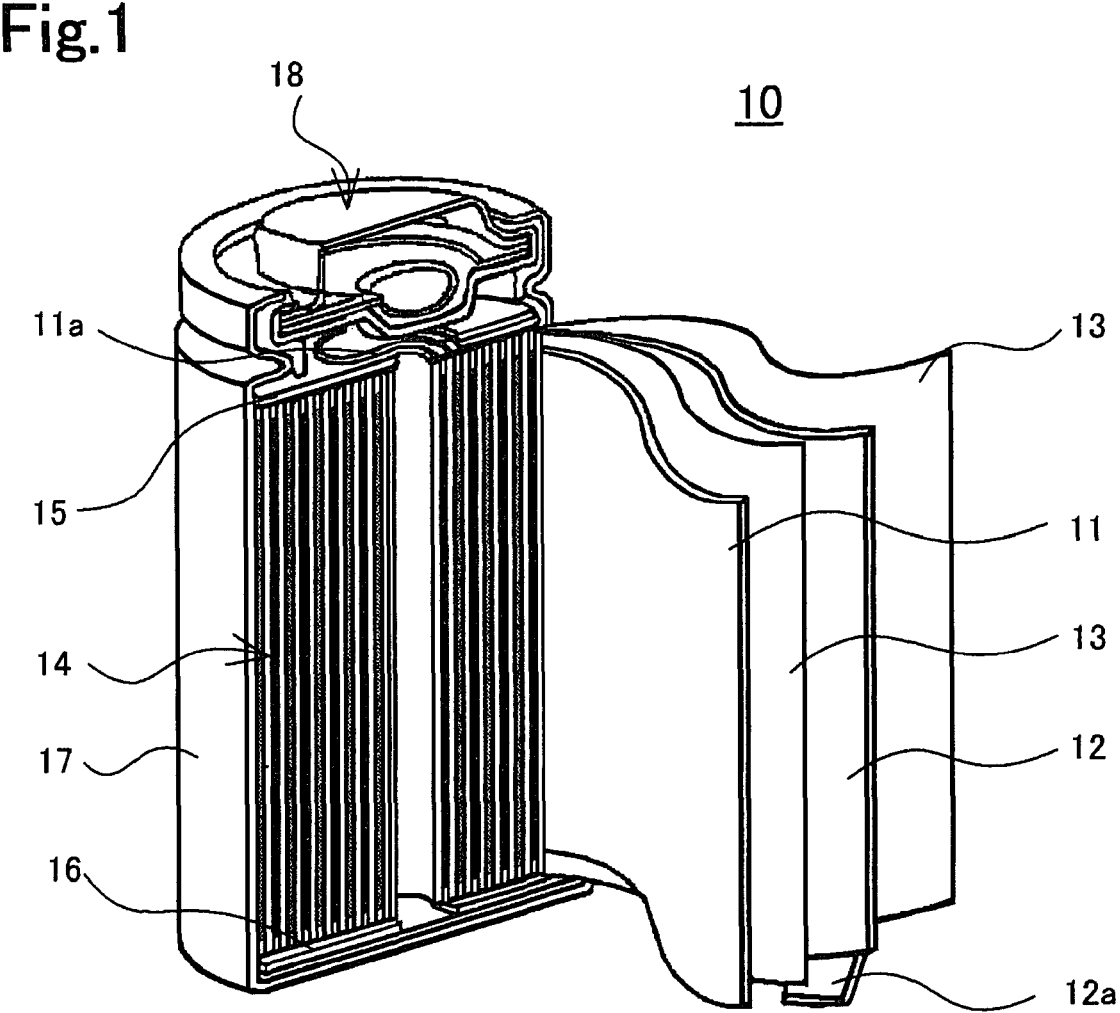
FIG. 1 is a perspective view showing a longitudinal section of a cylindrical-shaped nonaqueous electrolyte secondary battery.

Hereinafter, exemplary embodiments of the invention will be described in detail with examples and comparative examples. However, the examples described below are an illustrative example of nonaqueous electrolyte secondary batteries for embodying the technical spirit of the invention, are not intended to limit the invention to the examples, and may be equally applied to various modified batteries without departing from the technical spirit described in the Claims.

Examples 1 to 5 and Comparative Examples 1 and 2

Manufacture of Positive Electrode Active Material

First, sodium hydrogen carbonate was added to sulfuric acid solutions containing various compositions of Ni, Co, and Mn to coprecipitate carbonates, respectively. Then, thermal decomposition of each of the carbonates gave an oxide material. Next, lithium carbonate ($Li_2CO_3$) was prepared as a starting material for a lithium source, then the oxide material and lithium carbonate were mixed in a mortar, the obtained mixture was burned in air at 850° C. for 20 hours to synthesize a burned substance of a predetermined composition of lithium containing nickel-cobalt-manganese composite oxide. Then, the synthesized burned substance was pulverized until the average particle diameter became 10 μm. The synthesized materials A and B with predetermined compositions were further mixed in a predetermined mixing ratio and then the mixture was used as a positive electrode active material. The amounts of Ni, Co, and Mn in the materials A and B were analyzed by inductively coupled plasma (ICP) emission spectrometry, respectively.

The respective compositions of the materials A and B used in Examples 1 to 5 and Comparative Examples 1 and 2 are shown below.

material A: $Li_{1.00}Ni_{0.50}Co_{0.30}Mn_{0.20}O_2$
material B: $Li_{1.00}Ni_{0.35}Co_{0.35}Mn_{0.30}O_2$ Furthermore, the mixing ratios (molar ratios) of the materials A and B in the positive electrode active materials used in Examples 1 to 5 and Comparative Examples 1 and 2 are 100:0 (Comparative Example 1), 90:10 (Example 1), 80:20 (Example 2), 50:50 (Example 3), 20:80 (Example 4), 10:90 (Example 5) and 0:100 (Comparative Example 2), respectively.

Manufacture of Positive Electrode Plate

First, 85 parts by mass of the positive electrode active material with a certain composition prepared above, 10 parts by mass of carbon powder as a conductive material, and 5 parts by mass of polyvinylidene fluoride (PVdF) powder as a binder were mixed and then the whole was mixed with a solvent of N-methylpyrrolidone (NMP) to prepare a slurry. The slurry was coated on both sides of an aluminum collector with a thickness of 20 μm by a doctor blade method to form active material layers on both sides of the positive electrode collector. Then, the collector was compressed to 160 μm with a compression roller to manufacture a positive electrode plate with a short side length of 55 mm and a long side length of 500 mm.

Manufacture of Negative Electrode Plate

First, 95 parts by mass of natural graphite powder and 5 parts by mass of PVdF powder were mixed, the mixture was mixed with a solvent of NMP to prepare a slurry, and the slurry was coated on both sides of a copper collector with a thickness of 18 μm by doctor blade method to form active material layers. Then, the collector was compressed to 155 μm with a compression roller to manufacture a negative electrode plate with a short side length of 57 mm and a long side length of 550 mm. The potential of the graphite is 0.1 V with respect to Li. Furthermore, the filling amounts of the positive and negative electrode active materials were controlled so that, at the potential of the positive electrode active material as the design standard, the charging capacity ratio of the positive and negative electrodes (negative electrode charging capacity/positive electrode charging capacity) would become 1.1.

Preparation of Nonaqueous Electrolyte $LiPF_6$ was dissolved in a mixed solvent of equal volumes of ethylene carbonate and diethyl carbonate so as to give a 1 mol/L nonaqueous electrolyte, and the electrolyte was used for the manufacture of the battery. Vinylene carbonate was added to the nonaqueous electrolyte so as to be 3% by mass with respect to the whole amount of the electrolyte.

Manufacture of Battery

The positive and negative electrode plates manufactured above interposing a separator made of polypropylene microporous membrane were rolled cylindrically to manufacture a rolled electrode, the rolled electrode was inserted into a cylindrical-shaped battery outer can, the nonaqueous electrolyte prepared above was poured from an opening of the battery outer can, and then the battery outer can was sealed up with a current breaking cover to manufacture the nonaqueous electrolyte secondary batteries of Examples 1 to 5 and Comparative Examples 1 and 2. Each of the obtained nonaqueous electrolyte secondary batteries has a height of 65 mm, a diameter of 18 mm, and a theoretical capacity of 1600 mAh.

Measurement of Packing Property

Each of the positive electrode active materials used in Examples 1 to 5 and Comparative Examples 1 and 2 was filled up in a pelletter with a specimen filling part of $\phi_2$ cm, and applied a load of 0.3 ton/cm², and then the packing density of the powder was evaluated. The results are shown as relative values to the packing density of Comparative Example 1 as 100. The concluded results are shown in Table 1.

High-Temperature Cycle Test

Each of the batteries of Examples 1 to 5 and Comparative Examples 1 and 2 was charged in a temperature environment of 60° C. at a constant current of 1 It=1600 mA until the battery voltage reached 4.2 V, and after reaching the battery voltage of 4.2 V, the battery was charged at a constant voltage of 4.2 V until the charging current reached 30 mA. Then, the battery was discharged at a constant current of 1 It until the battery voltage reached 2.75 V. This cycle was regarded as the first charging and discharging cycle. Next, such-charging and discharging was repeated 300 cycles, and the rate of the discharging capacity of the 300th cycle to that of the first cycle (%) was calculated as a capacity retention ratio (%). The concluded results are shown in Table 1.

Overcharge Test

The overcharge test was performed as the following manner: when each of the batteries of Examples 1 to 5 and Comparative Examples 1 and 2 was overcharged at a constant current of 5 A for 3 hours, the battery with smoking or burning was judged abnormal. The concluded results are shown in Table 1.

TABLE 1

|  | Content of Material A (mol %) | Content of Material B (mol %) | Packing Property | High-Temperature Cycle Test Result (%) | The Number of Abnormal Batteries in Overcharge Test |
|---|---|---|---|---|---|
| Comparative Example 1 | 100 | 0 | 100 | 74 | 1 piece/5 pieces |
| Example 1 | 90 | 10 | 130 | 81 | 0 pieces/5 pieces |
| Example 2 | 80 | 20 | 150 | 85 | 0 pieces/5 pieces |
| Example 3 | 50 | 50 | 140 | 86 | 0 pieces/5 pieces |
| Example 4 | 20 | 80 | 140 | 85 | 0 pieces/5 pieces |
| Example 5 | 10 | 90 | 130 | 82 | 0 pieces/5 pieces |
| Comparative Example 2 | 0 | 100 | 90 | 75 | 5 pieces/5 pieces |

*material A: $Li_{1.00}Ni_{0.50}Co_{0.30}Mn_{0.20}O_2$
*material B: $Li_{1.00}Ni_{0.35}Co_{0.35}Mn_{0.30}O_2$ From the results shown in Table 1, it is clear that using the mixture of the materials A and B as the positive electrode active material improves the packing property, the high-temperature cycle characteristics and the overcharge characteristics remarkably. If the mixing ratio of the material A is less than 0.1, since the packing property is poor, the battery capacity becomes small along with the result of the high-temperature cycle test becomes inferior, so that the safety at the time of overcharge becomes slightly low. If the mixing ratio of the material A is more than 0.9, since the packing property is poor, the battery capacity becomes small along with the result of the high-temperature cycle test becomes inferior, so that the safety at the time of overcharge becomes extremely low. That is, in the case of Comparative Example 1 only using the material A and in the case of Comparative Example 2 only using the material B, each performance was the inferior result in comparison with the cases of Examples 1 to 5 using the mixtures of the materials A and material B. Accordingly, from the results shown in Table 1, it is clear that the mixing ratio of the materials A and B of 1:9 to 9:1 is preferred and the more preferable mixing ratio of the materials A and B is A:B=2:8 to 8:2.

It is assumed that using the mixture of the materials A and B improves the packing property, as well as distributes the reaction optimally at the time of charging and discharging, so that the side reaction observed in the single component system is inhibited, and thus the high-temperature cycle characteristics is improved remarkably. Furthermore, as for the overcharge characteristics, it is assumed that progress of a partially disproportionated reaction leads to current inhibition by the separator at the charging stage of a low state safe for the battery and the performance is improved.

Examples 6 to 9 and Comparative Examples 3 to 10

The nonaqueous electrolyte secondary batteries of Examples 6 to 9 and Comparative Examples 3 to 10 were manufactured in the same manner as in Examples 1 to 5, except that a mixture of the materials A and B with a molar ratio of A:B=50:50 was used, in which the material B had a composition of $Li_{1.00}Ni_{0.35}Co_{0.30}Mn_{0.35}O_2$ and the materials A had compositions of various x and y values. Then, the high-temperature cycle tests were performed in the same manner as in the cases of Examples 1 to 5. The concluded results are shown in Table 2. In Table 2, in order to compare the results of Comparative Examples 3 to 10, the results of Examples 6 to 9 are shown repeatedly.

TABLE 2

|  | Composition of Material A | | High-Temperature Cycle Test Result (%) |
|---|---|---|---|
|  | X | Y |  |
| Comparative Example 3 | 0.60 | 0.30 | 74 |
| Example 6 | 0.50 | 0.30 | 86 |
| Example 7 | 0.40 | 0.30 | 85 |
| Comparative Example 4 | 0.30 | 0.30 | 73 |
| Comparative Example 5 | 0.60 | 0.40 | 68 |
| Example 8 | 0.50 | 0.40 | 85 |
| Example 9 | 0.40 | 0.40 | 86 |
| Comparative Example 6 | 0.30 | 0.40 | 75 |
| Comparative Example 7 | 0.40 | 0.20 | 75 |
| Example 7 | 0.40 | 0.30 | 85 |
| Example 9 | 0.40 | 0.40 | 86 |
| Comparative Example 8 | 0.40 | 0.50 | 77 |
| Comparative Example 9 | 0.50 | 0.20 | 77 |
| Example 6 | 0.50 | 0.30 | 86 |
| Example 8 | 0.50 | 0.40 | 85 |
| Comparative Example 10 | 0.50 | 0.50 | 70 |

*material A: $Li_{1.00}Ni_xCo_yMn_zO_2$
*material B: $Li_{1.00}Ni_{0.35}Co_{0.30}Mn_{0.35}O_2$
*material A:material B = 50:50 (molar ratio)

Examples 10 and 11 and Comparative Examples 11 to 18

The nonaqueous electrolyte secondary batteries of Examples 10 and 11 and Comparative Examples 11 to 18 were manufactured in the same manner as in Examples 1 to 5, except that a mixture of the materials A and B with a molar ratio of A:B=50:50 was used, in which the material A had a composition of $Li_{1.00}Ni_{0.50}Co_{0.30}Mn_{0.20}O_2$ and the materials B had compositions of various x and y values. Then, the high-temperature cycle tests were performed in the same manner as in the cases of Examples 1 to 5. The concluded results are shown in Table 3. In Table 3, in order to compare the results of Comparative Examples 11 to 18, the results of Examples 3, 6, and hare shown repeatedly.

TABLE 3

|  | Composition of Material B | | High-Temperature Cycle Test Result (%) |
|---|---|---|---|
|  | X | Y |  |
| Comparative Example 11 | 0.40 | 0.30 | 77 |
| Example 6 | 0.35 | 0.30 | 86 |
| Example 10 | 0.30 | 0.30 | 85 |
| Comparative Example 12 | 0.25 | 0.30 | 76 |

TABLE 3-continued

| | Composition of Material B | | High-Temperature Cycle |
| --- | --- | --- | --- |
| | X | Y | Test Result (%) |
| Comparative Example 13 | 0.40 | 0.35 | 77 |
| Example 3 | 0.35 | 0.35 | 86 |
| Example 11 | 0.30 | 0.35 | 86 |
| Comparative Example 14 | 0.25 | 0.35 | 76 |
| Comparative Example 15 | 0.30 | 0.40 | 78 |
| Example 11 | 0.30 | 0.35 | 86 |
| Example 10 | 0.30 | 0.30 | 85 |
| Comparative Example 16 | 0.30 | 0.25 | 76 |
| Comparative Example 17 | 0.35 | 0.40 | 77 |
| Example 3 | 0.35 | 0.35 | 86 |
| Example 6 | 0.35 | 0.30 | 86 |
| Comparative Example 18 | 0.35 | 0.25 | 76 |

*material A: $Li_{1.00}Ni_{0.50}Co_{0.30}Mn_{0.20}O_2$
*material B: $Li_{1.00}Ni_xCo_yMn_zO_2$
*material A:material B = 50:50 (molar ratio)

From the results shown in Tables 2 and 3, it is clear that, by mixing the material A of $Li_{1.00}Ni_xCo_yMn_zO_2$ ($0.40 \leq x \leq 0.50$, $0.30 \leq y \leq 0.40$) and the material B of $Li_{1.00}Ni_xCo_yMn_zO_2$ ($0.30 \leq x \leq 0.35$, $0.30 \leq y \leq 0.35$), eventually the excellent high-temperature cycle characteristics is shown, further, only in the above composition range, the synergistic effect is appeared and the fine high-temperature cycle characteristics improvement effect is achieved.

In Examples 1 to 11 described above, the results of the various measurements where the molar ratio of Li with respect to whole transition-metals in the positive electrode active materials A and B (Li/whole transition-metals) w is 1.00 are shown. However, in the nonaqueous electrolyte secondary battery, lithium ions are desorbed from the positive electrode active material at the time of charging, and lithium ions are absorbed into the positive electrode active material at the time of discharging. Thus, it is preferred that the Li content ratios w of the materials A and B are $1.00 \leq w \leq 1.30$ when the nonaqueous electrolyte secondary battery is manufactured. If w is less than 1.00, at the time of charging, exhaustion of lithium ions in the positive electrode active material causes the battery capacity deterioration. Furthermore, if w is more than 1.30, since excess alkali which is not absorbed in the skeleton of the three-component positive electrode active material is generated at the time of charging and discharging, gas generation by a reaction of the excess alkali and the nonaqueous electrolyte causes deterioration of the high-temperature cycle characteristics. A preferable Li content ratio w in the materials A and B is $1.01 \leq w \leq 1.20$.

Furthermore, an addition of 1.5 to 5% by mass of vinylene carbonate into the nonaqueous electrolyte is preferred. If the content ratio of vinylene carbonate is less than 1.5% by mass, the addition of vinylene carbonate does not have the effect. Furthermore, if the content ratio of vinylene carbonate is more than 5% by mass, since vinylene carbonate is decomposed on the surface of the positive electrode active material to generate gas, the high-temperature cycle characteristics deteriorate, conversely.

What is claimed is:

1. A nonaqueous electrolyte secondary battery comprising:
a positive electrode plate having a positive electrode active material capable of absorption and desorption of lithium ions;
a negative electrode plate having a negative electrode active material capable of absorption and desorption of lithium ions; and
a nonaqueous electrolyte,
the positive electrode active material having a mixture of a material A and a material B, the material A being $Li_wNi_xCo_yMn_zO_2$ (where $1.00 \leq w \leq 1.30$, $x+y+z=1$, $0.40 \leq x \leq 0.50$, and $0.30 \leq y \leq 0.40$) and the material B being $Li_wNi_xCo_yMn_zO_2$ (where $1.00 \leq w \leq 1.30$, $x+y+z=1$, $0.30 \leq x \leq 0.35$, and $0.30 \leq y \leq 0.35$).

2. The nonaqueous electrolyte secondary battery according to claim 1, wherein a mixing ratio (a molar ratio) of the materials A and B is A:B=1:9 to 9:1.

3. The nonaqueous electrolyte secondary battery according to claim 1, wherein the w is in a range of $1.01 \leq w \leq 1.20$.

4. The nonaqueous electrolyte secondary battery according to claim 1, wherein the nonaqueous electrolyte includes 1.5 to 5% by mass of vinylene carbonate.

5. The nonaqueous electrolyte secondary battery according to claim 1, wherein the negative electrode active material includes a carbonaceous material.

* * * * *